Jan. 3, 1967    H. A. RUNDELL    3,295,367
SENSITIVE TORQUE METER
Filed Dec. 27, 1963    5 Sheets-Sheet 1
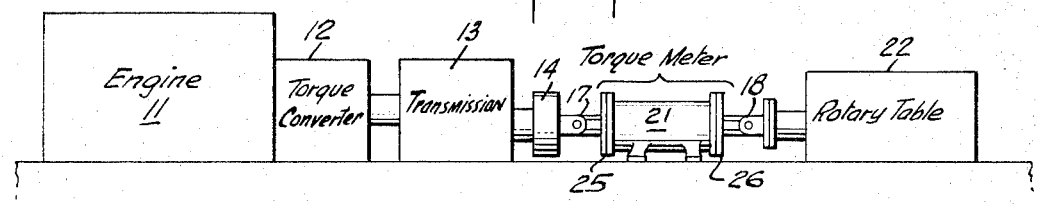
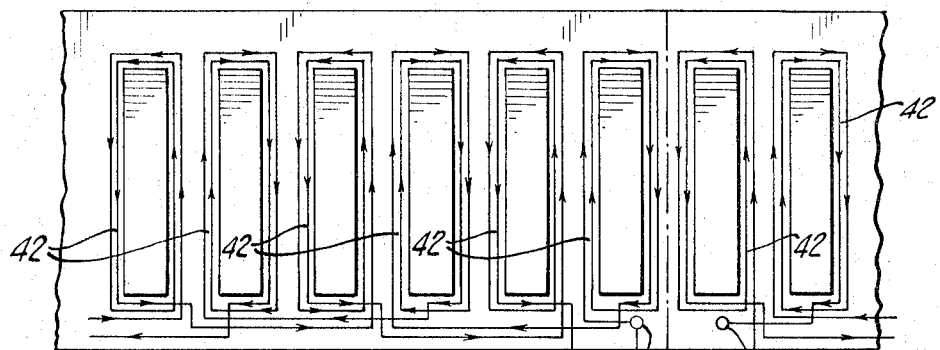
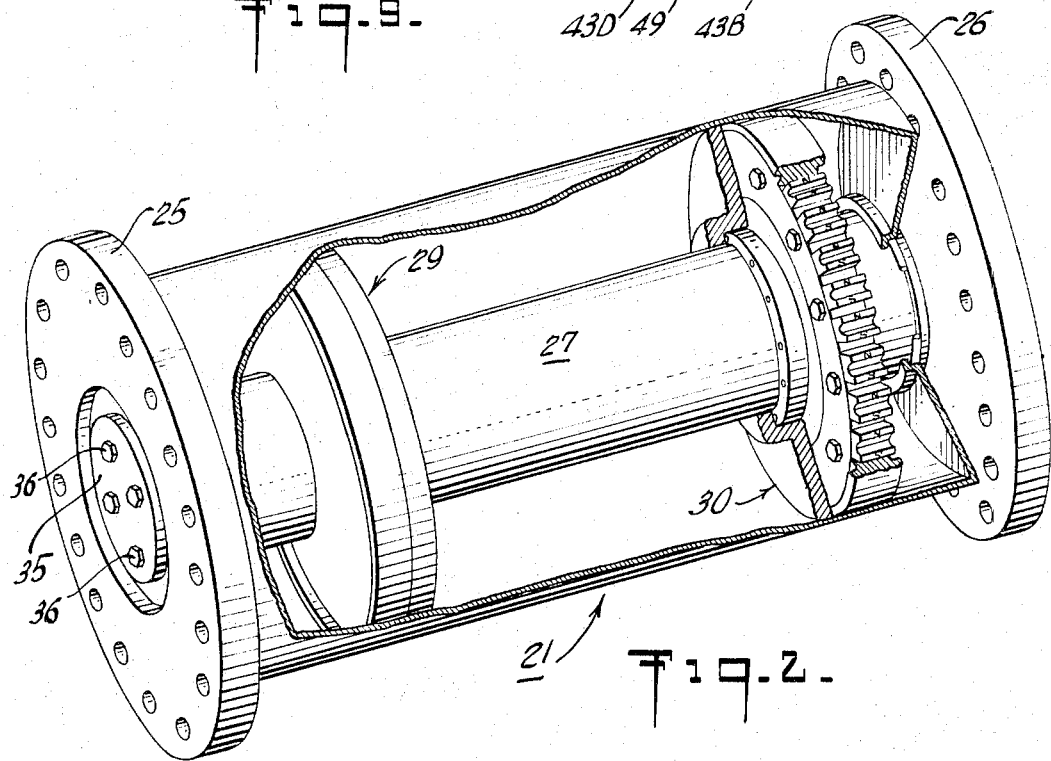

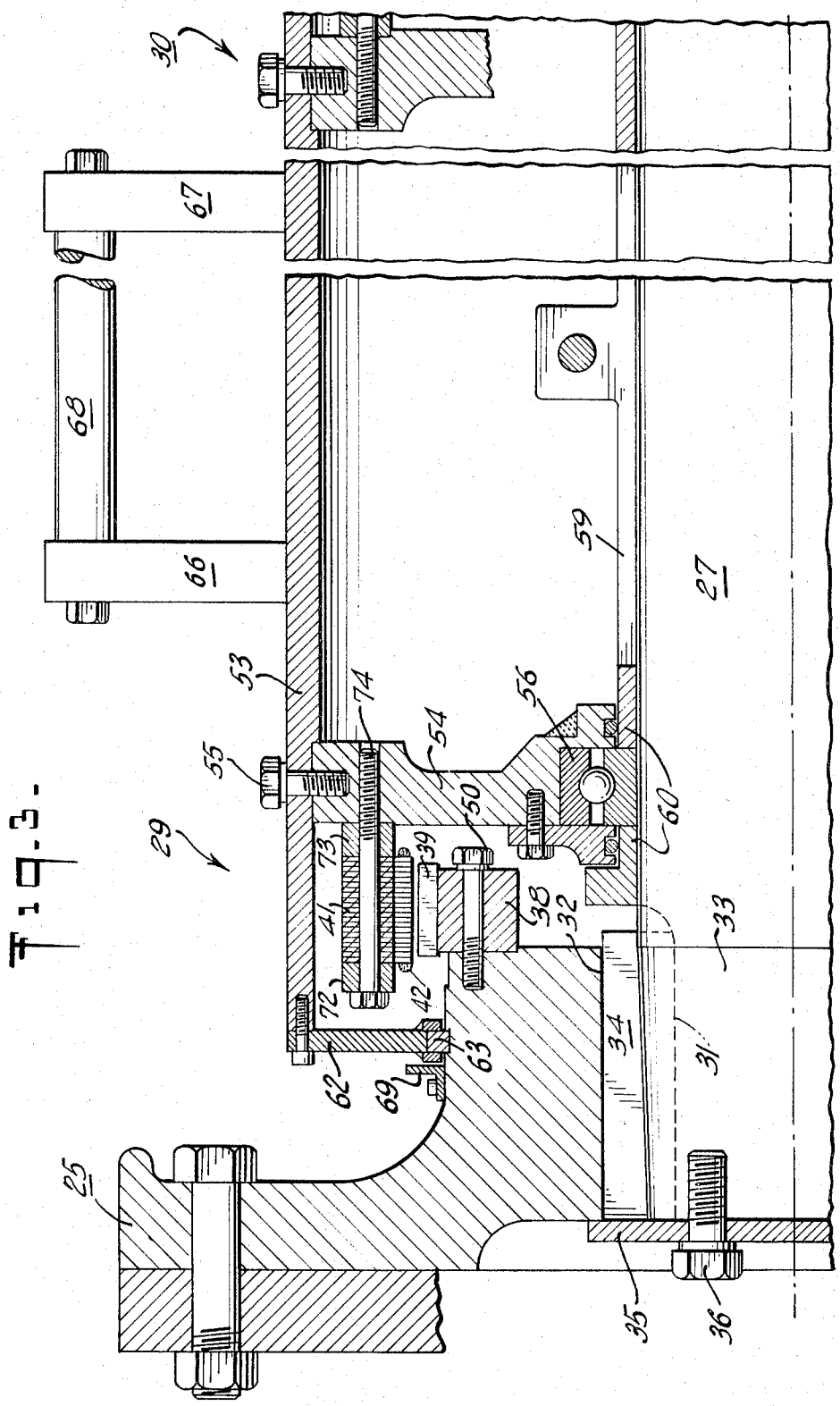

Jan. 3, 1967    H. A. RUNDELL    3,295,367
SENSITIVE TORQUE METER
Filed Dec. 27, 1963    5 Sheets-Sheet 3
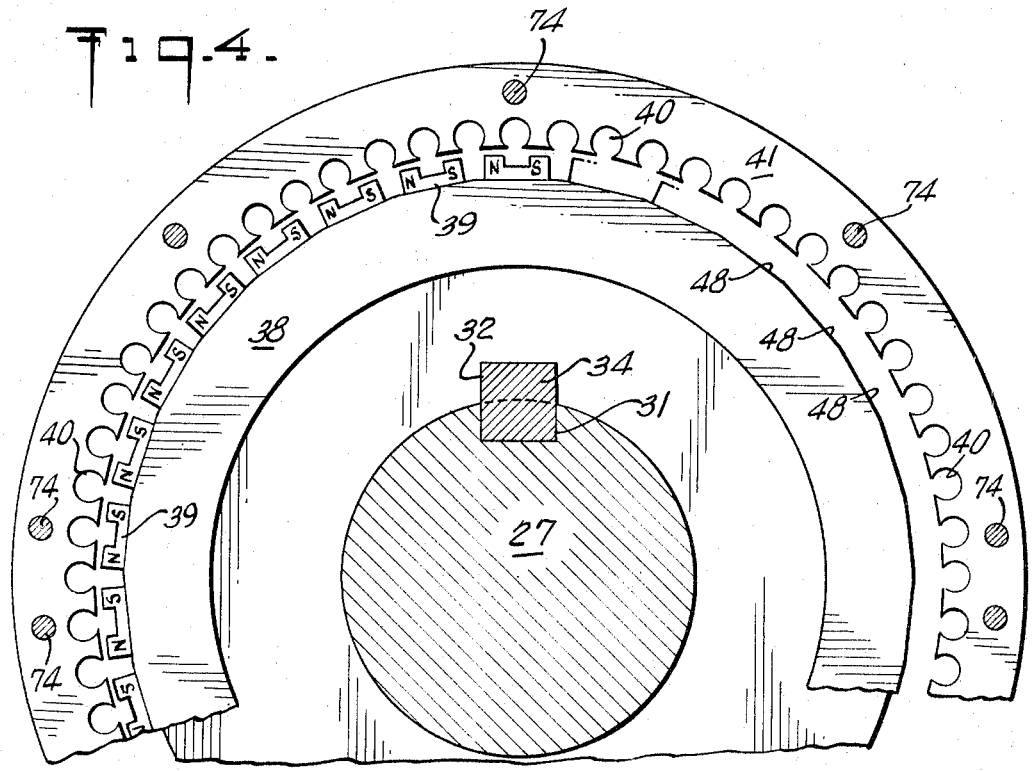
Fig. 4.
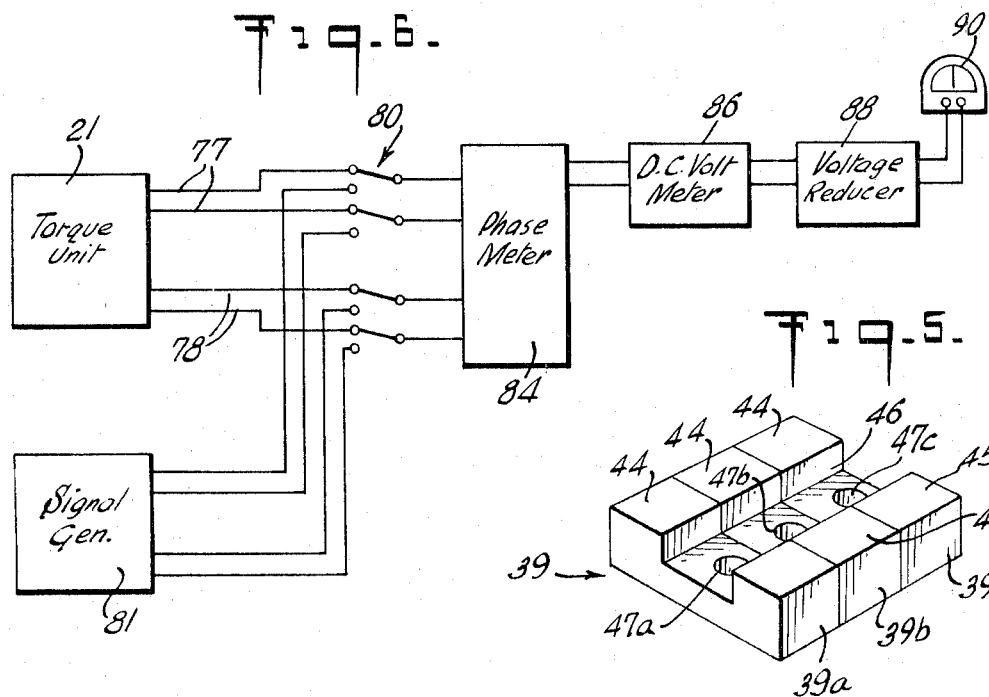
Fig. 6.
Fig. 5.

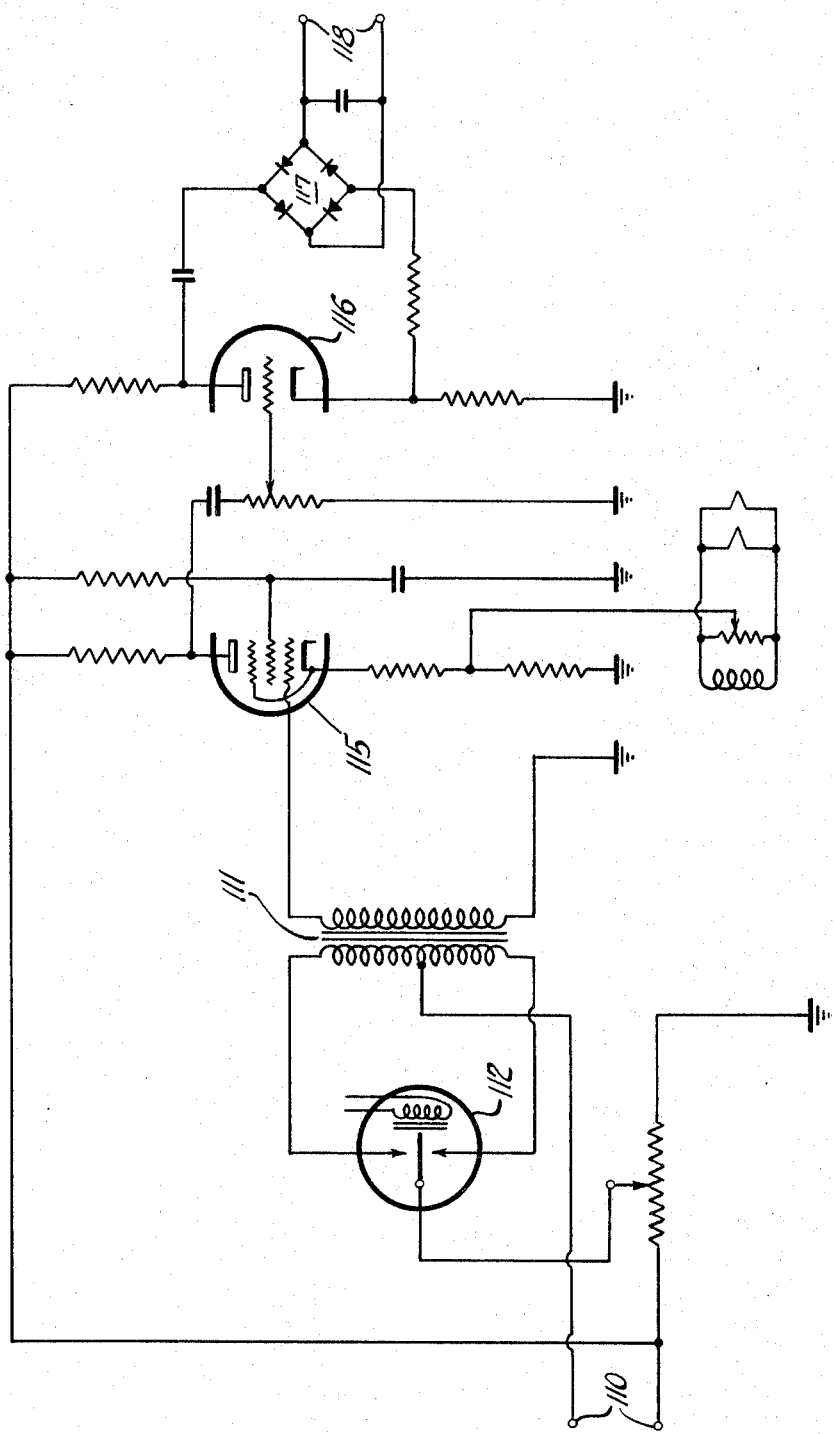

United States Patent Office 3,295,367
Patented Jan. 3, 1967

3,295,367
SENSITIVE TORQUE METER
Herbert A. Rundell, Houston, Tex., assignor to Texaco Inc., New York, N.Y., a corporation of Delaware
Filed Dec. 27, 1963, Ser. No. 333,849
7 Claims. (Cl. 73—136)

This invention concerns a heavy duty dynamic torque meter. More specifically it relates to a combination applicable to deep well drilling of the rotary type. In such combination there is a sensitive torque meter included between the power plant and the rotary table, as a direct connecting link in the drive shaft connections.

Heretofore it has been known, in a broad sense, to make use of two A.C. generators spaced axially apart along a shaft on which it is desired to measure the twist or torque applied. The comparative phase of the output A.C. signals from such pair of generators is measured to determine the amount of torque or twist of the shaft. However, the sensitivity of such an arrangement has not been satisfactory and many different improvements and modifications have been proposed for attempting to accomplish the same result with more satisfactory sensitivity. Among the modifications proposed have been some employing cathode ray output indicators, and some modifying the physical structure of the torque transmitting element (shaft) in addition to modifying the coupling with the signal generators. Also, there have been some modifications which make use of various kinds of indicia which are placed peripherally relative to the shaft at locations spaced along the shaft. The latter have arrangements for compring the rate of passage of such indicia opposite relatively fixed localities at the two spaced points. However, none of the foregoing prior known arrangements have been found satisfactory for use in connection with a torque measurement of the magnitude and type involved in a deep well rotary drilling operation.

Consequently, it is an object of this invention to provide a heavy duty torque meter adaptable for use with an oil well rotary drilling unit having direct shaft drive to the rotary table thereof.

Another object of the invention is to provide a heavy duty torque meter that is adapted to replace a coupling between universal joints in a heavy duty direct drive rotary power system.

Another object of the invention is to provide a dynamic torque meter that is heavy duty in nature but that also has sufficient sensitivity so that during deep well rotary drilling operations, of the loading being applied to the drill string may be followed closely enough so that changes brought on by different formations, or particularly those caused by difficulties (e.g. seizing of the bearings in the bit, etc.), may be readily observed and corrective actions may be taken.

Briefly, the invention concerns rotary type deep well drilling. It relates to a combination of a power plant for producing high torque rotary shaft power, a rotary table driven by said power plant, and a removable connecting link having a shaft and being adapted for location between said rotary table and said power plant. The said connecting link comprises a high torque torque meter, and the said torque meter includes a pair of axially spaced apart A.C. generators. Both of the generators have the rotors thereof integrally mounted on said connecting link shaft. Also, both have a plurality of pairs of salient poles extending substantially entirely around the periphery of each said rotor. The said torque meter also comprises means for measuring the phase angle between the A.C. signals of said two generators. Said phase angle is proportional to the torque applied to said shaft.

Again briefly, the invention relates to a sensitive high torque torque meter that comprises in combination a pair of axially spaced A.C. generators having a plurality of pairs of salient poles extending substantially entirely around the periphery of each of the rotors of said generators. The meter also comprises means for measuring the phase angle between the A.C. signals of said two generators. Said phase angle is proportional to the torque applied to said shaft.

The foregoing and other objects and benefits of the invention will be more fully appreciated in connection with the detailed description which follows, and which is illustrated in the drawings, in which:

FIGURE 1 is a schematic diagram showing a deep well drilling rotary power unit with the engine connected directly via rotary shaft type couplings to the rotary table;

FIGURE 2 is a schematic perspective view, broken away to show some of the interior elements of a torque meter unit according to the invention;

FIGURE 3 is an enlarged longitudinal cross section view illustrating in greater detail the construction of a preferred embodiment of the torque meter according to the invention;

FIGURE 4 is a transverse view showing the relationship of the rotor and stator elements of one of the A.C. generators of the torque meter unit;

FIGURE 5 is a perspective view illustrating one of the permanent magnets that are mounted on the rotors of the A.C. generators;

FIGURE 6 is a schematic block diagram showing the electrical interconnection of a group of elements that may be employed with the torque meter to provide the indication of phase relation between the A.C. generator signals. Such indication represents the torque being measured by the torque meter unit;

FIGURE 8 is a schematic circuit diagram illustrating a conversion unit for reducing the voltage level of the output signals following the phase meter to a level that is adapted for indicating and recording; and FIGURE 9 is a diagram indicating the manner of winding the armature coils on the stators of each of the generators.

Figure 7:
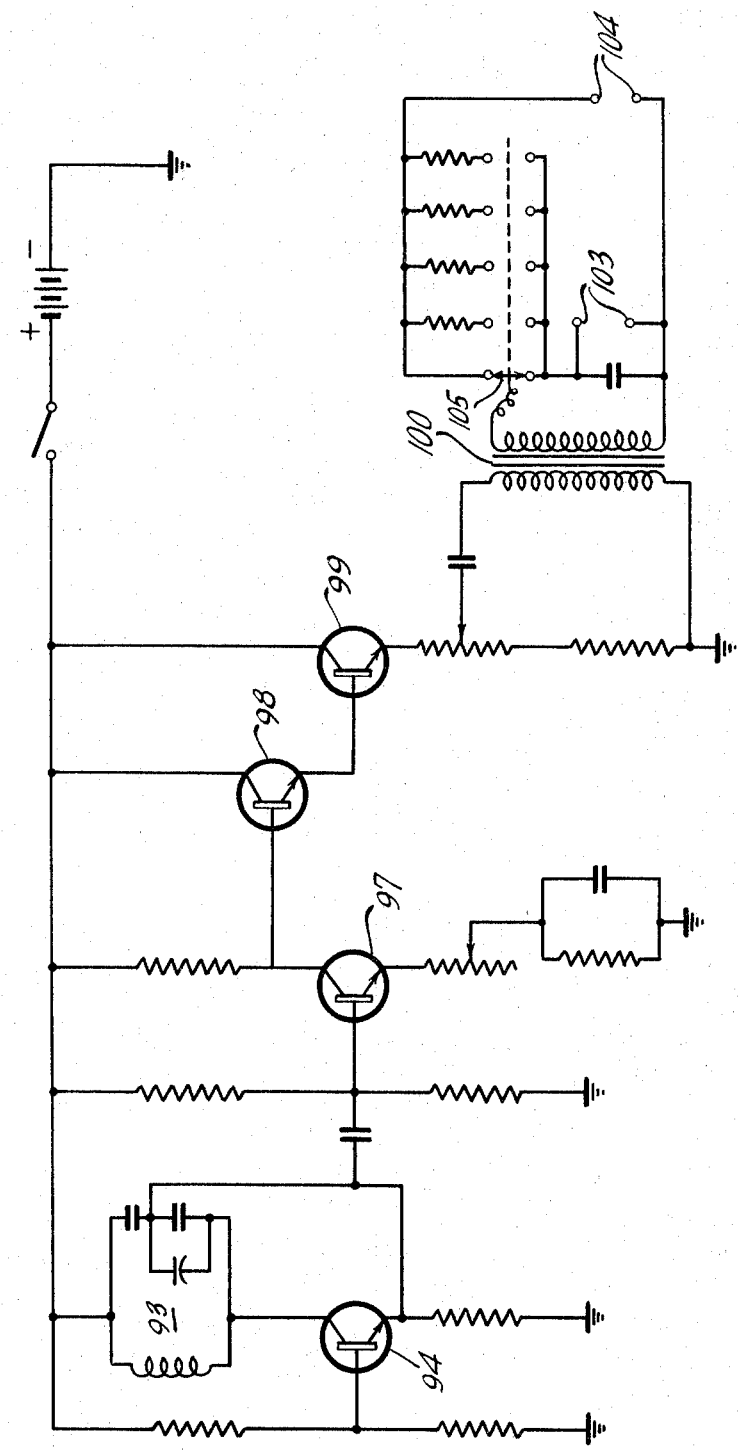
FIGURE 7 is a schematic circuit diagram illustrating an oscillator type signal generator unit that may be employed as a calibration signal generator for the electrical portion of the torque meter system.

Referring to FIGURE 1 it is pointed out that there is schematically indicated a deep well rotary drilling system. This includes an engine 11 for driving the rotary table of a direct coupled rotary drilling rig which will include a derrick (not shown) The driving engine power may be derived from various types of engines, e.g., a Caterpillar engine.

The engine 11 is connected via a torque converter 12, which in turn is connected to a transmission 13 that reduces the speed of revolution of the drive shaft output relative to the input from the converter. The output of transmission 13 is carried along via direct shaft coupling, which may include a brake unit 14 located close to the transmission 13.

Since there is usually a change in vertical level from the engine 11 to the drilling rig (not shown), there are a pair of universal joints 17 and 18 connected into the direct rotary drive. Prior to this invention there would be a plain shaft linking the universals 17 and 18. However, there is instead a torque meter 21 that is coupled to the joints 17 and 18 in any feasible manner, e.g., by bolted flange couplings as schematically indicated. This power drive connection terminates at a rotary table 22 which is a standard element employed with a drill rig for applying rotary power to the drill string, which in turn connects to the drill bit at the bottom of the hole.

It is pointed out that the forces involved in deep well rotary drilling operations are of such an order of magnitude that the drill string may be twisted off under circumstances when there is a binding of the bit, or part of the drill string, in the hole. However, with a torque meter structure according to this invention, the shaft drive being employed (between the engine and the rotary table) may include as a coupling element therein a section of shaft that incorporates a torque meter in an integral manner, but which coupling element is otherwise of the same size and strength as the other driving shaft connections involved. Furthermore, by employing torque meter structure according to this invention, sufficient sensitivity is available to provide meaningful and important torque measurements or readings throughout any drilling operation.

Referring to FIGURE 2, it is to be noted that (as schematically shown) a torque measuring unit 21 includes within its total structure a pair of coupling flanges 25 and 26 that are securely fastened one on each end of a shaft 27. As illustrated in more detail hereafter, the fastening of the flanges 25 and 26 to the shaft 27 may be done with adequately heavy key structure to transmit the high torque loads involved. However, it will be understood that it may be found preferable to construct the flanges as an integral part of the shaft, e.g., by machining the unit of a shaft and end flanges out of a solid rod of steel or other suitable material.

The torque measurements are made by determining the amount of twist of the shaft 27 that occurs between a pair of A.C. generator units 29 and 30. These generator units are substantially identical to one another (except for being near opposite ends of the shaft) so that the structure of one of them only need be described in detail.

It will be appreciated that, in general terms, the operation of the torque measuring function of the meter is such that under no load conditions the A.C. signal outputs of generator units 29 and 30 are substantially in phase with one another. While, under load the shaft 27 will be twisted and consequently the relative phase relation between the A.C. signals generated by units 29 and 30 will be shifted correspondingly.

Referring now to FIGURES 3 and 4, some of the details of structure according to the preferred embodiment of the invention that is here illustrated, will be described. It will be appreciated that, as mentioned above, the structure for each of the two generator units 29 and 30 is substantially the same. Therefore the description of the elements of unit 29 only will be given here. The corresponding elements of unit 30 are located at the other end of shaft 27 and occupy substantially mirror image positions relative to the corresponding elements of unit 29.

Flange 25 is attached securely to shaft 27 for unitary rotation therewith, and for transmittal of rotary power over the shaft as part of the power drive couplings. Thus, it will be appreciated by anyone skilled in the art that (as indicated above) the flange 25 may be constructed as a unitary part of the shaft 27, by machining both together out of a single piece of material, if desired. As illustrated in FIGURES 3 and 4, the flange 25 is attached to the shaft 27 by being fitted onto a tapered end portion 33 of the shaft 27. There is a square cross section key 34 that fits into a key-way 31 on the shaft 27 and into a groove 32 machined into the flange 25. The key 34 is held in place by an end plate 35 that is bolted onto the end of the shaft 27 by means of a plurality of bolts 36, as illustrated.

The rotor of generator unit 29 is formed by a ring 38 that is attached to the hub of the flange 25 in any feasible manner. There are a plurality of permanent magnets 39 attached to the periphery of the ring 38, and spaced evenly all the way around. These magnets 39 provide independent magnetic fields each having a pair of salient poles. Altogether these pairs of salient poles extend completely around the periphery of the rotor, and the magnets are constructed with dimensions as necessary to provide corresponding magnetic paths with those formed in connection with the armature of the generator unit 29. It is pointed out that this feature of the construction makes use of all of the magnets and corresponding armature paths, all of the way around the rotor-stator structure, so that any discrepancies in machining or the like are averaged out. This provides better accuracy and sensitivity in the torque measurement.

The stator portion of the generator unit 29 includes a plurality of circular shaped holes 40 (see FIGURE 4) that are located near the inner edge of a magnetic material laminated ring 41. The holes 40 of the separate laminations forming the stator ring 41, are aligned to form slots having their axis parallel to the axis of the generator unit 29. These slots have pairs of oppositely wound armature windings 42 (FIGURE 3) as indicated in the diagram of FIGURE 9. These windings are not shown in FIGURE 4, in the interest of clarity. The use of laminations in constructing the stator ring 41 is standard practice for alternating current machinery, in order to minimize eddy current losses.

An important feature of the invention relates to the structure of the generators 29 and 30, and particularly the fact that there are provided the above described plurality of pairs of salient poles formed by the magnets 39 with the corresponding plurality of pairs of oppositely wound armature windings 42. This arrangement not only provides for the improved sensitivity and accuracy mentioned above, but in addition it adds greatly to the amplitude of A.C. signals generated. The latter, in itself greatly increases the sensitivity. This amplitude increase is because of the full reversal of polarity that is obtained by having alternate north and south poles pass each position of correspondence between the magnet pole faces and the tooth faces that are formed by the inner peripheral surface of the stator ring between the slots formed by the holes 40.

The windings 42 are made in accordance with the diagram of FIGURE 9, such that alternate coils are wound in the same direction and all are connected together in series. Thus, one set of coils with windings in one direction are connected in series ending at one end at a terminal 43C and at the other end at a terminal 43A, while the other set with windings in the other direction are connected in series ending at one end at a terminal 43D and at the other end at a terminal 43B. The terminals 43C and 43D are connected electrically by a connection 49 to complete the series connection of all the coils, and the terminals 43A and 43B provide output connections for the A.C. signals that are generated as the rotor turns and moves the field magnets 39 into and out of correspondence with the armature tooth faces. The E.M.F. generated in all of the coils is in the same direction during a given half cycle of the A.C. signals generated, because of the alternate change in coil winding direction that corresponds with the change in polarity of the flux as the alternate north and south poles of the field magnets pass the coils.

It will be appreciated that the coil windings 42 could be wound from one piece of wire with the direction of winding being reversed for each successive pole. In such case there would only be two terminals needed, instead of four.

It is pointed out that while various structural arrangements might be employed, a preferred construction for attaching the magnets 39 onto the ring 38 of the rotor, provides flat surfaces 48 around the outer periphery of the ring 38. Then each of the magnets 39 is bolted onto one of these flat surfaces 48.

As illustrated in FIGURE 5, each magnet 39 is a horseshoe type permanent magnet that is made up of three units 39a, 39b, 39c mounted side by side. It has two rectangular pole faces 44 and 45 joined together by the body of the magnet. The body has a flat rectangular base to fit snuggly against one of the flat surfaces 48 (FIGURE 4) to which it is attached (around the outer periphery of the ring 38). Between the pole faces 44 and 45 there is a rectangular (in cross section) groove or cut-out portion 46, and along the trough of the groove there are three holes 47a, 47b and 47c for use in bolting the magnet to the flat surface 48 of the ring 38. Of course, each magnet 39 might be made up of one single magnet if desired.

It is to be observed that in addition to there being provided a magnification of thirty times with respect to angular displacements (by reason of the number of poles employed in the A.C. generator structure) the invention gives the benefits of sensitivity and accuracy set forth above.

Other advantages of the invention include the feature which provides increased sensitivity without loss of the basic high strength qualities of the machine. Such feature is the simple structure which avoids complications and extra structural arrangements that are ordinarily employed in A.C. generators in order to product pure sine wave output signals. Thus, in the generator structure employed in the invention the A.C. signals generated are in effect not true sine waves but rather approach a triangular wave form. Such wave form provides for more accurate and sensitive measurement of phase difference between the A.C. generator signals that are being compared.

Again referring to FIGURE 3 and continuing with the structure of generator 29 as well as the structure for the torque meter unit 21, it will be observed that the rotor ring 38 is attached to an inner face of the hub of flange 25, by means of a plurality of bolts 50. This arrangement holds the ring 38 securely on the flange 25 for rotation at all times with the flange and with that end of the shaft 27. The stator ring 41 which is made up of a plurality of thin laminations of permeable magnetic material, as indicated above, is held in place (or supported) within a housing 53. The housing 53 is cylindrical and has attached within it a stator support web 54. Web 54 may be securely attached to the housing 53 in any feasible manner, e.g., by means of a plurality of peripherally spaced bolts 55 as indicated. Furthermore, the web 54 carries an outer race of a ball-bearing 56 plus surrounding structure which provides for grease seals at the surface of clamps 60 surrounding the shaft 27. The inner race of ball-bearing 56 may be attached onto the shaft 27 in any feasible manner. For example, there is a sleeve and clamp arrangement 59 that cooperates with the supporting rings or clamps 60 in holding the inner race of the ball-bearing 56 securely in place on the surface of the shaft 27.

There is a dust-seal arrangement at the open end of the housing 53, which includes a flat ring 62 bolted against the open edge of the housing 53, as illustrated in FIGURE 3. Ring 62 carries at the inner edge thereof a soft sealring 63 located between supporting flanges that are attached to the edges of plate 62 as illustrated. For protection of the seal-ring 63 there may be a slinger-ring 69 bolted onto the hub of flange 25 adjacent to the inner edge of the dust plate or ring 62.

It will be appreciated that there may be exterior support, or handling, structure attached to the outside of the housing 53. For example, that illustrated in FIGURE 3 shows a pair of brackets 66 and 67 that are joined by a bar 68 bolted between them.

The stator ring 41 is held in place by having the laminations thereof clamped between a pair of spacer and clamp rings 72 and 73, and these are bolted onto the face of the support web 54 by a plurality of bolts 74 as illustrated. It will be appreciated that many equivalent structural arrangements may be provided both for mounting the plurality of permanent magnets 39 on a rotor attached to the shaft 27, and likewise for mounting a stator unit (including the armature windings thereon) in place surrounding the rotor magnets.

Referring to FIGURE 6, it is pointed out that the electrical system employed in connection with the torque meter unit is shown in block diagram form. As illustrated by the block labeled "torque unit," the torque meter 21 has two output circuits, indicated by the circuit connection lines 77 and 78. These circuit connections are taken from the AC generator units 29 and 30 respectively and are merely output leads taken from the armature windings, e.g., at terminals 43A and 43B (FIGURE 9), for each of the two respective generator units. There is a multi-pole switch 80 that is used to alternatively connect either the outputs from the A.C. generators of the torque unit 21 or a pair of calibration signals obtained from a signal generator 81, that may take the form illustrated in FIGURE 7.

A phase meter 84 may be any feasible type of instrument which can accept the two A.C. signals and compare them for the phase relationship therebetween. This element forms no part per se of the invention, and a phase meter that may be employed is one commercially manufactured by Ad-Yu Electronics Inc. of Passaic, New Jersey. Such instrument is designated by that company as a "precision phase meter" and a type 405L is the designating number given. This has the advantage of measuring the phase angle between input signals independently of the amplitudes thereof. The output from phase meter is in the form of a D.C. voltage which varies from 300 volts to 286 volts as the phase relationship between the signals varies from 0° to 180°. In order to adapt such output from the phase meter for use with recording instruments and indicating instruments at a drilling rig, there is employed a D.C. volt meter 86 which may be a commercially available instrument such as one manufactured by Hewlett-Packard Company of Palo Alto, California. The D.C. volt meter output signal is again at about a 300 volt level, and consequently this is transformed by using a voltage reducer 88 which in turn may take the form of a chopper amplifier as illustrated in the FIGURE 8 circuit. The low voltage output of reducer 88 is then fed to all of the various indicating elements for the system, such as a meter to be observed by the driller and a recorder to maintain a record of the torque load throughout, etc., all of which are schematically indicated by a meter 90 illustrated in FIGURE 6.

FIGURE 7 is a circuit diagram illustrating a preferred embodiment of the signal generator 81. As indicated, this signal generator is no more than an oscillator which is arranged to provide a pair of output signals that may selectively be set for calibration purposes, either in phase or out of phase by varying amounts. The oscillator circuit employed uses transistors and tank circuits, such as the capacitance-inductance tank circuit 93, that is connected into the circuit for a transistor 94. The A.C. oscillation signal created is then amplified via the transistors 97, 98 and 99 to be applied via a transformer 100 to the two sets of output terminals 103 and 104, with a switch 105 for setting the phase relationships, as indicated.

The circuit diagram of FIGURE 8 shows a voltage reducer which may be employed for the aforementioned change in the signal voltage level from about 300 volts, to something on the order of eight volts. There is a pair of input terminals 110 which apply the signal through alternative halves of a transformer 111, that has the contacts of a chopper 112 connected to the ends of its primary winding. The A.C. signal thus created is amplified in two stages as indicated, by means of a pentode 115 followed by a triode 116. Then the output signal is rectified in a bridge network rectifier 117 with the output thereof connected to a pair of output terminals 118.

Referring once more to FIGURE 1 it is to be observed that a practical benefit to be gained by the use of a torque meter in accordance with this invention, is that the size of the torque meter may be made such as to provide for ready replacement or interchangeability with a coupling shaft going between the flanges of the universal joints 17 and 18. Consequently, in the event that any difficulties should arise with the torque meter, it may be readily removed without holding up the operation of the drilling rig for any substantial length of time.

While a particular embodiment of the invention has been described in considerable detail in accordance with the applicable statutes, this is not to be taken as in any way limiting the invention but merely as being descriptive thereof.

I claim:

1. In rotary type deep well drilling, in combination, a power plant for producing high torque rotary shaft power, a rotary table driven by said power plant, a removable connecting link having a shaft and being adapted for location between said rotary table and said power plant, said connecting link comprising a high torque torque meter including a pair of axially spaced apart A.C. generators both having the rotors thereof intergrally mounted on said connecting links shaft, said generators each having a plurality of pairs of salient poles extending substantially entirely around the periphery of each said rotor, said pairs of salient poles comprising a plurality of horseshoe type permanent magnets, and means for measuring solely the phase angle between the A.C. signals of said two generators, said phase angle being proportional to the torque applied to said shaft.

2. The combination according to claim 1 wherein said permanent magnets are mounted on said rotors.

3. The combination according to claim 2 wherein said generators each have a magnetic material stator with a winding thereon corresponding to each of said individual poles.

4. A sensitive torque meter, comprising a shaft for transmitting torque, a pair of single phase A.C. generators spaced axially apart along said shaft, each said generator having a rotor integrally attached to said shaft, said rotor having a large plurality of horsehoe type permanent magnets spaced equally around the outer periphery thereof, each said generator having a stator surrounding said rotor, said stator having a large plurality of coil windings connected in series and corresponding to the number of permanent magnets, the turns of said coils being wound alternately in opposite directions for reaction with the north and south poles of said magnets, and means for measuring solely the phase displacement of the A.C. voltages generated by said pair of generators in order to determine the torque applied to said shaft.

5. The combination according to claim 4 wherein said rotors have a corresponding plurality of flat surfaces around the periphery thereof for accommodating said permanent magnets.

6. The combination according to claim 5 wherein said magnets are each composed of three individual magnets mounted side by side on each of said flat surfaces.

7. The combination according to claim 6 wherein the number of said horseshoe magnets on each rotor is thirty and the number of coil windings on said stator is sixty.

References Cited by the Examiner

UNITED STATES PATENTS

| 1,789,862 | 1/1931 | Bricken | 73—136 X |
| 2,635,465 | 4/1953 | White | 73—136 |
| 2,640,352 | 6/1953 | Ellison et al. | 73—136 |
| 2,766,617 | 10/1956 | Tyler et al. | 73—136 |
| 2,978,902 | 4/1961 | Felder | 73—136 |

FOREIGN PATENTS

| 739 | 1/1909 | Great Britain. |
| 559,116 | 2/1944 | Great Britain. |

RICHARD C. QUEISSER, *Primary Examiner.*

C. A. RUEHL, *Assistant Examiner.*